Oct. 27, 1964    A. J. ANDREWS    3,153,950
REEL HANDLE
Filed Nov. 29, 1960
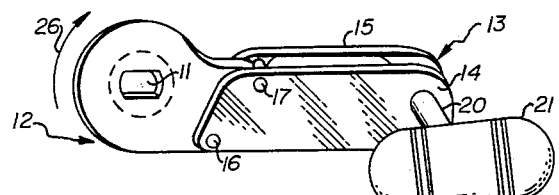
FIG. I.
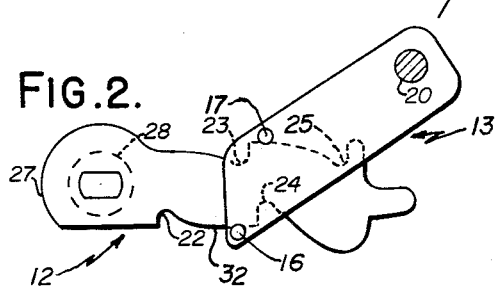
FIG. 2.
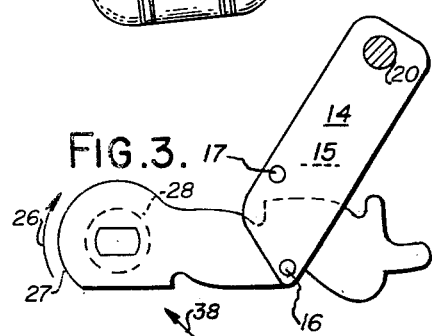
FIG. 3.
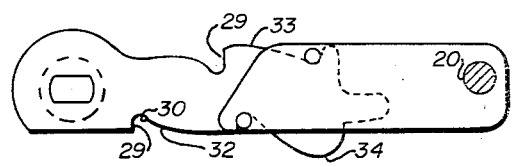
FIG. 4.
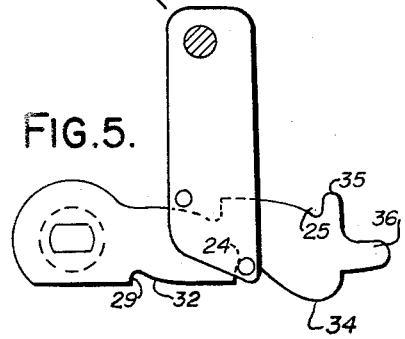
FIG. 5.
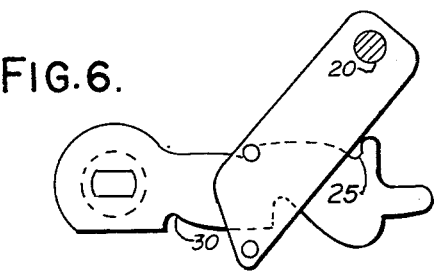
FIG. 6.
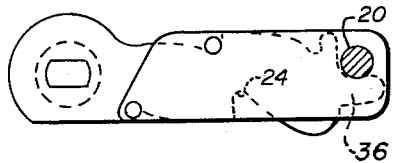
FIG. 7.
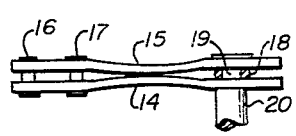
FIG. 8.
INVENTOR.
ALBERT J. ANDREWS
BY Paul Bliven
ATTORNEY United States Patent Office 3,153,950
Patented Oct. 27, 1964

3,153,950
REEL HANDLE
Albert J. Andrews, 311 Cayuga St., Santa Cruz, Calif.
Filed Nov. 29, 1960, Ser. No. 72,353
4 Claims. (Cl. 74—546)

The present invention relates to the construction of a reel handle, and in more particular to a handle suitable for use on a fishing reel, the reel being mounted on a fishing pole for taking in or letting out fishing line by winding such on a bobbin, where the particular type of fishing activity engaged in makes it desirable to, at times, vary the rapidity with which line may be taken in onto such reel or the tension that is placed on such line. In further particular, the present invention relates to a reel handle construction in which the length, or radius, of a reel handle arm may be easily varied with but a momentary pause in the operation of winding line on the spool of the reel to which such handle may be attached.

The prior art shows reel arms and crank arms that may be varied in length. Some of these prior arms were varied in length by the loosening or removal and replacing of nuts or screws, a construction unsuitable where it is desirable to increase and decrease the arm length during the catching and landing of a fish. Also, reel arms have been devised which lengthen automatically as the applied torgue is increased, but there are times in the use of a reel when such operation is not desired. Further, there have been reels in which the arm was provided with telescoping parts and a latch operable to prevent or allow telescopic movement thereof. The latching means for these telescopic arms may have a classification of latch means operable independent of the handle operation, and a classification of latch means operable dependent on the handle operation. Those latches which are independent require the manipulation of a spring catch or some form of latch by a movement separate from the rotational operation of the reel handle. Such a movement is often one which is undesirable when reeling in a fish or heavy weight. The dependent latch allows the arm to be lengthened or shortened by a change in, but while maintaining, the rotary movement of the hand in operating the reel handle. This appears to be the more desirable of the two.

Thus it is an object of the present invention to devise a reel handle arm which may be changed in length by a change in its rotary movement, and to devise such a handle so that it is simple in construction and operation.

Another object of the invention is to devise such a handle so that the change in length thereof is positive, and is not dependent on springs as such for moving it from one position to another or to hold the parts in a selected position.

The above defects of the prior art devices are remedied and the foregoing objects and others are achieved in a device in which a fishing reel handle has its arm made in two parts which have sliding and swinging movement one with respect to the other. If the handle is considered to be mounted on a side of a reel for crank like movement about and on the outboard end of the drive shaft of such reel, which shaft rotates the bobbin thereof, one part of the arm is fixed to and rotatable with such shaft and another part of the arm slides and swings on the fixed part so as to have radial movement with respect to such shaft and swinging movement in the plane of rotation of such fixed part. In the direction of rotation of the crank to wind line on the bobbin, the movable part of the arm locks to the fixed part while in the other direction of rotation the movable part swings with respect to the fixed part, in the nature of an elbow joint. The movable part is fixed to the other arm part by a pair of spaced apart pins secured to the movable part and located one on each edge of the fixed part, and a pair of spaced apart notches in each edge of the fixed part to receive said pins when said arm is adjusted for either of two lengths.

One form of the invention outlined above is hereinafter described in detail and shown in the accompanying drawings, in which:

FIGURE 1 is a perspective view of the handle assembly, including an extensible arm and a finger grip.

FIGURES 2 to 7, inclusive, are elevational views of the arm parts in various relative positions achieved during extension and contraction of the arm, the knob of the finger grip being broken away.

FIGURE 8 is a plan view of the movable part of the arm, as shown in FIGURE 4, the knob of the finger grip being broken away.

In the views of the drawings, no parts are shown of a reel such as would be adapted to have the illustrated handle secured thereto. However, the handle is provided with an opening 11 for the sliding fit reception therein of the outboard threaded end of a flat sided reel drive shaft. The opening 11 is, also, flat sided to conform to the shaft and the shaft will have a shoulder to limit and position the handle. A washer and nut will clamp the handle on the shaft and to such shoulder. All this is well known in the art.

The complete handle is shown in the perspective view of FIGURE 1. The handle arm has two main parts which are movable relative to each other. One of these parts is in the form of an irregular shaped plate 12 which is adapted to be fixed to a reel drive shaft by the reception and retention in the opening 11 thereof of the end of such shaft. This part 12 may be called the fixed part, or plate, of the arm. The other main arm part 13 is composed of two spaced apart leaves 14, 15 between which the fixed plate 12 is slidably fitted. This other part of the arm may be called the movable part of the arm. The leaves 14, 15 of the movable part 13 are held in their spaced relationship by means of two shoulder ended pins 16, 17 adjacent the inner end of such part, and a spacing washer 18 and the shouldered end 19 of a knob stem 20 which carries on its outer end a finger knob 21. The finger knob is rotatable on its stem and is the part that is held by the operator of the reel and revolved about the shaft opening 11 in the operation of the crank and the reel to which it may be attached. The shouldered ends of the pins 16, 17 and the stem 20 pass thru aligned openings in the leaves 14, 15 and the shouldered end 19 of the stem 20, also, passes thru the opening of the spacing washer 18, which washer is between the leaves. The free ends of the shouldered portions are upset to hold the pin and stem ends in their respective openings. The washer 18 is of the same thickness as the plate 12, and the central portions of the pins 16, 17 have the length of this thickness. The leaves 14, 15 are resilient and set in a bend slightly longitudinally thereof before their assembly, and are assembled so that their concaveness is outward of the assembly as shown in FIGURE 8 which is a view of only the movable arm part 13.

The fixed arm part 12 is in the form of an elongated plate with an irregular outline. Each edge of the plate is provided with two spaced apart hook-like notches, those 22, 24 on the lower edge, as shown in the drawings, and those 23, 25 on the upper edge. The lower edge may be called the leading edge because in winding line on the reel the rotation of the handle is clockwise as indicated in the drawings by the rotational arrows 26 of FIGURES 1 and 3, and this lower edge is ahead of the upper edge, the trailing edge, in such rotation. This winding direction is the same for all of the drawing's figures. The portion of the fixed plate 13 surrounding the shaft opening 11 may be called the hub 27 thereof, and the back side of this hub is provided with a raised portion 28 surrounding the shaft opening. The thickness of this raised portion 28 is slightly greater than the thickness of one of the leaves of the movable arm part 13 so as to space the handle and the back side leaf 15 from the side of the reel.

On the lower edge of the plate 12, the inner 22 of the two lower edge notches is placed adjacent the hub 27, and the outer 24 is placed radially outward of the first the distance which it is desired that the arm be extensible. Both these lower hook-like notches face outward of the arm. The upper notches face inward of the arm, opposite to the lower. That is, each of the notches has a steep side 29 and a gently sloping side 30. The lower notches have their steep side radially of the arm inward of the notch while the upper notches have their steep sides radially outward. The radially inward notch 23 of the upper notches is outward of the inward lower notch 22 a distance of about a half inch, and the upper notches are spaced apart the same distance as the lower notch.

The arm parts 12 and 13 may be said to be in a working, or aligned, position in the showing of either FIGURE 1, 4, or 7. FIGURES 2, 3, 5 and 6 are illustrative of arm length shift positions. In an aligned position, each of the shouldered pins 16, 17 is seated in a notch of the fixed arm part 12, the lower pin 16 being in one of the lower notches 22, 24, and the upper pin 17 being in one of the upper notches 23, 25, and both pins will be in either the inner notches 22, 23 or in the radially outward notches 24, 25. In an aligned position, the pins 16, 17 are spaced longitudinally of the arm a distance such that the working torque applied to the arm will not damage the pins or their retention in the leaves of the movable arm 13, among other considerations. In profile, the edges 32, 33 of the fixed arm 12 between the notches are convex, and a line connecting the upper notches is parallel to a line connecting the lower notches. Radially outward of the outer notches 24, 25 there is a downward projection 34 and an upward projection 35. The purpose of these projections is to act as stops to limit the extensive movement of the arm parts 12, 13 with respect to each other, as the pins 16, 17 contact their respective projections 34, 35. A finger 36 extending radially from the outer end of the fixed arm part 12 may be used to act as an auxiliary stop to contact the leaves' spacing washer 18 when the arm parts are in contracted aligned position as shown in FIGURE 7.

FIGURES 1 and 7 show the handle arm parts 12, 13 in their contracted, shortened, position. If line is being taken in on a reel to which the handle is attached, the handle will be in forward, clockwise, rotation by the action of an operator grasping the finger knob 21 and giving it and the handle such rotation, which will be as shown in the various views and as indicated by the rotational arrows, and the reel and its handle will have inertial movement to continue such rotation. With such inertial movement, the handle arm is extended by the action of the operator of the reel, while holding the knob 21, reducing the knob's forward rotation or even slightly reversing the rotation while at the same time pulling radially outward on the knob. That is, instead of the normal winding force tangential to the direction of rotation of the crank, a component of force is applied to the knob which is approximately in the direction of the force arrow 37 of FIGURE 2. This causes the pins, or abutments, 16, 17 to leave their respective notches 22, 23 and the lower pin 22 to slide along the lower convex edge 32 of the plate 12 as shown in FIGURE 2 until the lower pin 16 reaches and seats in the outer lower notch 24 as shown in FIGURE 3. Then, if forward rotation of the knob 21 and the movable part 13 of the arm is resumed, the arm parts will go into alignment as shown in FIGURE 4 and line winding will be continued. The lower pin 16 resting in the outer notch 24, acts as a pivot for the movable arm part 13 in its movement from its FIGURE 3 position to that of its aligned and extended position in FIGURE 4. The slight inward, opposed, convexity given to the leaves 14, 15 as illustrated in FIGURE 8 taken in conjunction with the resiliency thereof provides for a slight amount of friction between the arm parts 12, 13 when they are assembled. This friction between these parts keeps them from having unwanted random rotational movement therebetween. This is an aid in the extension and contraction of the reel arm, and in the rotation thereof.

The reel arm is moved from the extended position of FIGURE 4 to the contracted position of FIGURE 7 in much the same manner as for its extensive movements. A force by means of the knob is applied in the showings of FIGURES 4 and 5 to the rotating handle in the general direction of the force arrow 38 of FIGURE 5. This causes the movable arm part 13 to pivot on the lower pin 16 in the lower outer notch 24 as shown in FIGURE 5 until the loose arm part 13 is in the position of FIGURE 5. When the position of FIGURE 5 is reached, normal rotation in the direction of the rotational arrows is resumed, resulting in the movable arm part 13 taking successive positions with respect to the fixed arm part 12 as shown successively in FIGURES 6 and 7 to their aligned contracted position of FIGURE 7. It is to be noted in FIGURE 6 that the upper pin 17 seats in the inner upper notch 23 and that in this position the pin 17 will act as a pivot for the movable arm part 13 as it moves from its FIGURE 5 to its FIGURE 7 position. Thus it will be seen that the pins and notches not only serve to retain the arm parts 12, 13 in their aligned positions but, also, form and act as parts of a ratchet in moving the arm parts between their contracted and extended positions. The loose arm part 13 serves as the handle of the ratchet, and its operation moves it along the fixed part 12. When the arm parts are in either of their aligned positions, each pin 16, 17 bears against the steep side 29 of a notch of the fixed arm part 12, and the movable arm part 13 is secured to the fixed arm part to act as a cantilever with respect to such fixed arm part, and the arm parts become a single rigid crank arm when rotated in the indicated direction.

Thus it will be seen that applicant has devised a simple handle construction for use on a fishing reel, and which handle may have its length extended or contracted with but a momentary reduction or pause in the winding operation of a reel incorporating such handle.

Having thus described my invention, its construction and operation, I claim:

1. A fish reel handle, comprising: a crank having an inner and an outer end, said crank being divided into two parts, a fixed part carrying said inner end and adapted to be fixed to a shaft by said fixed part being formed adjacent said inner end with an opening therein adapted to receive therein such shaft, and a movable part carrying said outer end and movable with respect to said fixed part, a finger knob and a finger knob stem, said knob being rotatably mounted on said stem and said stem being secured to said movable part adjacent said outer end, and said crank constructed to have a variable length by forming one of said parts as an elongated plate with opposed edges, each of said edges having a plurality of irregularities, and forming the other of said parts as a pair of spaced apart leaves receiving therebetween said plate, and said leaves having integral therewith and therebetween two separate abutment means, one of said abutment means formed and placed to contact and to be moved along one of said irregular edges and the other abutment means formed to contact and to be moved along the other of said irregular edges.

2. The combination of claim 1 in which said leaves are spring leaves having frictional contact with said plate, and in which the irregularities of each of said edges form spaced notches, and in which each of said abutment means formed to contact said irregular edges is in the form of a pin that contacts one or the other of said spaced notches in one of the edges of the opposed irregular edges.

3. The combination of claim 2 in which each irregular edge between the spaced notches thereof is convex in form.

4. The combination of claim 3 in which said notches are displaced relative to each other along said edges, and in which said pins are displaced relative to each other longitudinally of said other part.

References Cited in the file of this patent

UNITED STATES PATENTS

| | | |
|---|---|---|
| 790,031 | Crowell et al. | May 16, 1905 |
| 1,003,907 | Hoffman | Sept. 19, 1911 |
| 2,326,023 | Fredricksen | Aug. 3, 1943 |
| 2,612,920 | Williams | Oct. 7, 1952 |
| 3,011,362 | Cronholm | Dec. 5, 1961 |